US008937588B2

(12) United States Patent
Wheatley et al.

(10) Patent No.: US 8,937,588 B2
(45) Date of Patent: Jan. 20, 2015

(54) INTERACTIVE INPUT SYSTEM AND METHOD OF OPERATING THE SAME

(75) Inventors: Stephen Wheatley, Calgary (CA); Jeremy Hansen, Calgary (CA); Gregory Forrest, Calgary (CA)

(73) Assignee: SMART Technologies ULC (CA)

( * ) Notice: Subject to any disclaimer, the term of this patent is extended or adjusted under 35 U.S.C. 154(b) by 279 days.

(21) Appl. No.: 13/525,028

(22) Filed: Jun. 15, 2012

(65) Prior Publication Data

US 2012/0319941 A1  Dec. 20, 2012

Related U.S. Application Data

(60) Provisional application No. 61/497,238, filed on Jun. 15, 2011.

(51) Int. Cl.
*G09G 5/00* (2006.01)
*G06K 9/00* (2006.01)
*G06F 3/01* (2006.01)

(52) U.S. Cl.
CPC .............. *G09G 5/00* (2013.01); *G06K 9/00624* (2013.01); *G06F 3/017* (2013.01)
USPC ............................. 345/156; 345/173; 345/175

(58) Field of Classification Search
CPC .................. H04N 19/00363; H04N 19/00757; H04N 1/212; H04N 2101/00; H04N 3/155; H04N 3/1562; H04N 5/23293; H04N 5/374; H04N 17/002; H04N 5/335; G06F 2203/04104; G06F 3/0428; G06F 1/13338; G06F 3/042; G06F 3/0488; G06F 3/0425; G06F 3/005; G06F 2203/04806; G06F 3/11; G06F 2203/04101; G06K 7/10722; G06K 7/10792; G06K 7/10861; G06K 9/00624

USPC ........ 345/156–179; 340/22; 178/18.09–18.11
See application file for complete search history.

(56) References Cited

U.S. PATENT DOCUMENTS

| | | |
|---|---|---|
| 5,448,263 A | 9/1995 | Martin |
| 6,141,000 A | 10/2000 | Martin |
| 6,335,724 B1 | 1/2002 | Takekawa et al. |
| 6,337,681 B1 | 1/2002 | Martin |
| 6,674,424 B1 * | 1/2004 | Fujioka .......................... 345/157 |
| 6,747,636 B2 | 6/2004 | Martin |
| 6,803,906 B1 | 10/2004 | Morrison et al. |
| 6,828,959 B2 | 12/2004 | Takekawa et al. |
| 7,232,986 B2 | 6/2007 | Worthington et al. |
| 7,236,162 B2 * | 6/2007 | Morrison et al. ............. 345/173 |
| 7,274,356 B2 | 9/2007 | Ung et al. |
| 7,532,206 B2 | 5/2009 | Morrison et al. |
| 2002/0060668 A1 * | 5/2002 | McDermid .................... 345/173 |
| 2007/0089915 A1 | 4/2007 | Ogawa et al. |
| 2009/0063991 A1 | 3/2009 | Baron et al. |

(Continued)

FOREIGN PATENT DOCUMENTS

| | | |
|---|---|---|
| WO | 2011/085478 A1 | 7/2011 |
| WO | 2011/085479 A1 | 7/2011 |
| WO | 2011/085480 A1 | 7/2011 |

*Primary Examiner* — Alexander Eisen
*Assistant Examiner* — Sanjiv D Patel
(74) *Attorney, Agent, or Firm* — Katten Muchin Rosenman LLP

(57) ABSTRACT

A method of operating an interactive input system comprises capturing images of a region of interest at a first frame rate; processing a first pixel subset of images captured at the first frame rate to detect the presence of an object; and if an object is detected, capturing images of the region of interest at a second frame rate.

39 Claims, 12 Drawing Sheets

(56) References Cited

U.S. PATENT DOCUMENTS

| | | |
|---|---|---|
| 2009/0278794 A1 | 11/2009 | McReynolds et al. |
| 2009/0278795 A1 | 11/2009 | Hansen et al. |
| 2011/0095989 A1 | 4/2011 | McGibney et al. |
| 2011/0199336 A1* | 8/2011 | Kao et al. ............... 345/175 |
| 2011/0254811 A1* | 10/2011 | Lawrence et al. ........ 345/175 |
| 2011/0291988 A1* | 12/2011 | Bamji et al. ............. 345/175 |
| 2012/0105373 A1* | 5/2012 | Liu et al. ................. 345/175 |
| 2012/0249410 A1 | 10/2012 | Hill et al. |

* cited by examiner

INTERACTIVE INPUT SYSTEM AND METHOD OF OPERATING THE SAME

CROSS REFERENCE TO RELATED APPLICATION

This application claims the benefit of U.S. Provisional Application Ser. No. 61/497,238 filed on Jun. 15, 2011 and entitled "INTERACTIVE INPUT SYSTEM AND METHOD OF OPERATING THE SAME", the entire content of which is incorporated herein by reference.

FIELD OF THE INVENTION

The present invention relates to an interactive input system and a method of operating the same.

BACKGROUND OF THE INVENTION

Interactive input systems that allow users to inject input (e.g. digital ink, mouse events, etc.) into an application program using an active pointer (eg. a pointer that emits light, sound or other signal), a passive pointer (eg. a finger, cylinder or other object) or other suitable input device such as for example, a mouse or trackball, are well known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; 7,274,356; and 7,532,206 assigned to SMART Technologies ULC of Calgary, Alberta, Canada, assignee of the subject application, the contents of which are incorporated by reference in their entirety; touch systems comprising touch panels employing electromagnetic, capacitive, acoustic or other technologies to register pointer input; tablet and laptop personal computers (PCs); personal digital assistants (PDAs) and other handheld devices; and other similar devices.

U.S. Pat. Nos. 6,335,724 and 6,828,959 to Takekawa et al. disclose a coordinate-position input device having a frame with a reflecting member for recursively reflecting light provided in an inner side from four edges of the frame forming a rectangular form. Two optical units irradiate light to the reflecting member and receive the reflected light. With the mounting member, the frame can be detachably attached to a white board. The two optical units are located at both ends of any one of the frame edges forming the frame, and at the same time the two optical units and the frame body are integrated to each other.

Above-incorporated U.S. Pat. No. 6,803,906 to Morrison et al. discloses a touch system that employs machine vision to detect pointer interaction with a touch surface on which a computer-generated image is presented. A rectangular bezel or frame surrounds the touch surface and supports digital imaging devices at its corners. The digital imaging devices have overlapping fields of view that encompass and look generally across the touch surface. The digital imaging devices acquire images looking across the touch surface from different vantages and generate image data. Image data acquired by the digital imaging devices is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y) coordinates relative to the touch surface using triangulation. The pointer coordinates are conveyed to a computer executing one or more application programs. The computer uses the pointer coordinates to update the computer-generated image that is presented on the touch surface. Pointer contacts on the touch surface can therefore be recorded as writing or drawing or used to control execution of application programs executed by the computer.

U.S. Patent Application Publication No. 2007/0089915 to Ogawa et al. discloses a position detection apparatus that has imaging sections, each of which includes an area image sensor, in which light-sensitive elements are arrayed in a two-dimensional pattern, and an image formation lens, are placed to the lateral two points of a detection plane. A selection device selects particular pixels corresponding to a particular field of view of a reflex reflection frame from the light-sensitive elements within a range of a given field of view having been imaged by the imaging sections. An image processing device image-processes a particular image signal corresponding to the selected particular pixels and then outputs an indicating position coordinate of a pointing device.

Certain models of interactive whiteboards sold by SMART Technologies ULC under the name SMARTBoard™, that employ machine vision technology to register pointer input, make use of imaging devices that have housing assemblies, and that select a subset of pixels of acquired images for processing to compensate for mechanical alignment issues. For example, U.S. Patent Application Publication No. 2009/0278795 to Hansen et al. assigned to SMART Technologies ULC discloses one such housing assembly. Although selecting pixel subsets of acquired images to correct for mechanical issues works well, improvements to enhance performance with regard to pointer imaging and power savings are desired.

It is therefore an object of the present invention at provide a novel interactive input system and a method of operating the same.

SUMMARY OF THE INVENTION

Accordingly, in one aspect there is provided a method of operating an interactive input system comprising capturing images of a region of interest at a first frame rate, processing a first pixel subset of the images captured at the first frame rate to detect the presence of an object, and if an object is detected, capturing images of region of interest at a second frame rate.

According to another aspect there is provided a method of powering on an interactive input system operating in a standby mode, comprising capturing images of a region of interest, processing a pixel subset of captured images to detect the presence of an object, and if an object is detected, powering on the interactive input system.

According to another aspect there is provided an interactive input system comprising an interactive surface, at least one imaging device capturing images of a region of interest proximate the interactive surface at a first frame rate, and processing structure receiving a first pixel subset of the captured images, processing the first pixel subset to detect the presence of an object, and if an object is detected, conditioning the at least one imaging device to capture images of the region of interest at a second frame rate.

According to yet another aspect there is provided a non-transitory computer readable medium embodying a computer program for execution by a computer to perform a method of operating an interactive input system, the method comprising capturing images of a region of interest at a first frame rate, processing a first pixel subset of the images captured at the first frame rate to detect the presence of an object, and if an object is detected, capturing images of the region of interest at a second frame rate.

According to yet another aspect there is provided a non-transitory computer readable medium embodying a computer program for execution by a computer to perform a method of powering on an interactive input system operating in a standby mode, the method comprising capturing images of a region of interest, processing a pixel subset of the captured images to detect the presence of an object, and if an object is detected, powering on the interactive input system.

According to yet another aspect there is provided an interactive board comprising an interactive surface, and at least one imaging device capturing images of a region of interest proximate the interactive surface, the imaging device capturing images at a first frame rate until an object is detected and then captured images at a second frame rate, processing structure receiving a first pixel subset of the captured images, processing the first pixel subset to detect the presence of an object, and if an object is detected, conditioning the at least one imaging device to capture images of the region of interest at a second frame rate.

BRIEF DESCRIPTION OF THE DRAWINGS

Embodiments will now be described more fully with reference to the accompanying drawings in which.

DETAILED DESCRIPTION OF THE EMBODIMENTS

In the following, a method and interactive input system are described. The interactive input system is operative in a plurality of modes including an interactive mode and a standby mode. In the standby mode, components of the interactive input system monitor a region of interest proximate an interactive surface to detect the presence of a pointer. When a pointer is detected, the operation mode of the interactive input system is switched from the standby mode to the interactive mode. In the interactive mode, components of the interactive input system allow pointer activity made proximate to the interactive surface to be recorded as writing or drawing or used to control execution of one or more application programs executed by a general purpose computing device.

Figure 1:
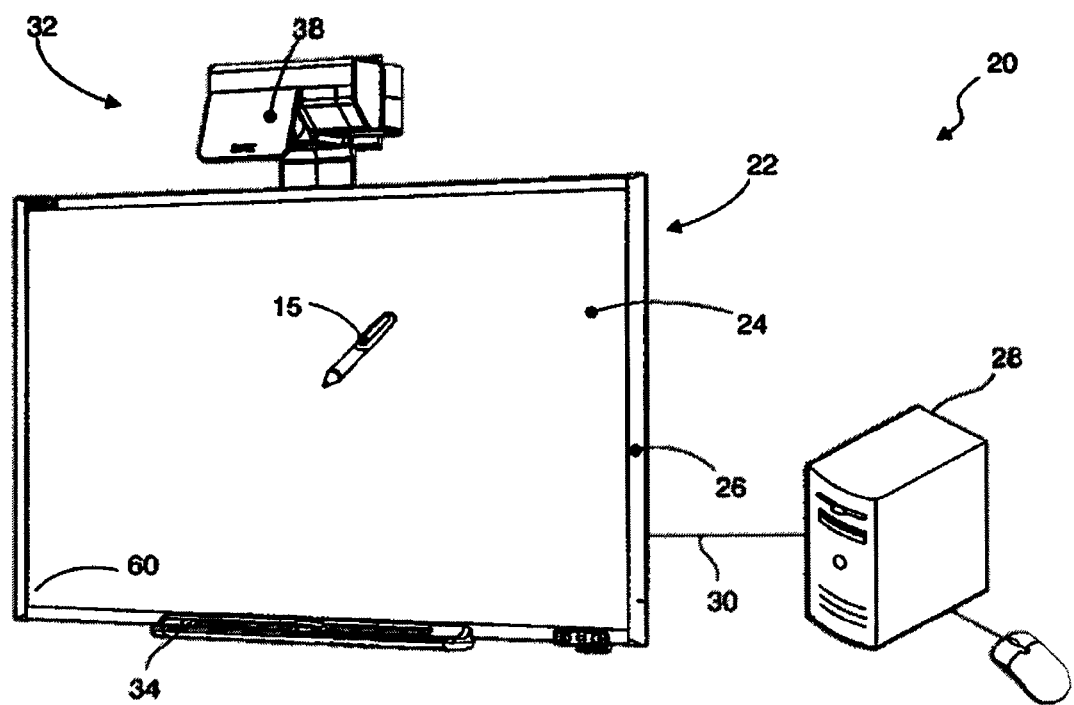
FIG. 1 is a schematic, partial perspective view of an interactive input system.
Figure 2:
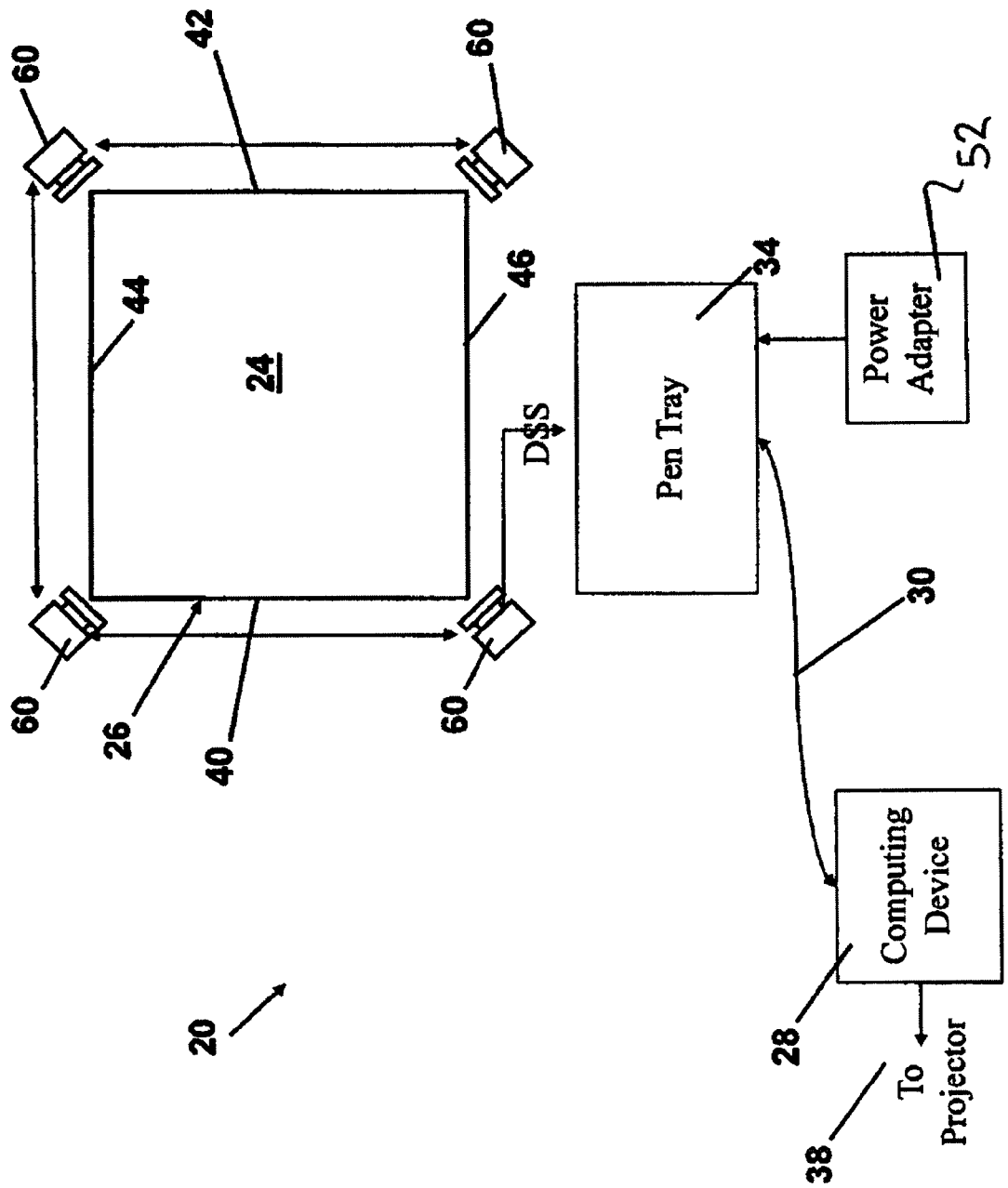
FIG. 2 is a block diagram of the interactive input system of FIG. 1.

Turning now to FIGS. 1 and 2, an interactive input system is shown and is generally identified by reference numeral 20. Interactive input system 20 allows a user to inject input such as digital ink, mouse events, commands, etc. into an executing application program. In this embodiment, interactive input system 20 comprises a two-dimensional (2D) interactive device in the form of an interactive whiteboard (IWB) 22 mounted on a vertical support surface such as for example, a wall surface or the like or otherwise supported or suspended in an upright orientation. IWB 22 comprises a generally planar, rectangular interactive surface 24 that is surrounded about its periphery by a bezel 26. A boom assembly 32 is also mounted on the support surface above the IWB 22. Boom assembly 32 supports a short-throw projector 38 such as that sold by SMART Technologies ULC under the name "SMART UX60", which projects an image, such as for example, a computer desktop, onto the interactive surface 24.

The IWB 22 employs machine vision to detect one or more pointers brought into a region of interest in proximity with the interactive surface 24. The IWB 22 communicates with a general purpose computing device 28 executing one or more application programs via a universal serial bus (USB) cable 30 or other suitable wired or wireless communication link. General purpose computing device 28 processes the output of the IWB 22 and adjusts image data that is output to the projector 38, if required, so that the image presented on the interactive surface 24 reflects pointer activity. In this manner, the IWB 22, general purpose computing device 28 and projector 38 allow pointer activity proximate to the interactive surface 24 to be recorded as writing or drawing or used to control execution of one or more application programs executed by the general purpose computing device 28.

The bezel 26 in this embodiment is mechanically fastened to the interactive surface 24 and comprises four bezel segments 40, 42, 44 and 46 that extend along the sides of the interactive surface 24. Bezel segments 40 and 42 extend along opposite sides of the interactive surface 24 while bezel segments 44 and 46 extend along the top and bottom of the interactive surface, respectively. In this embodiment, the inwardly facing surface of each bezel segment 40, 42, 44 and 46 comprises a single, longitudinally extending strip or band of retro-reflective material. To take best advantage of the properties of the retro-reflective material, the bezel segments 40, 42, 44 and 46 are oriented so that their inwardly facing surfaces lie in a plane generally normal to the plane of the interactive surface 24.

A tool tray 34 is affixed to the IWB 22 adjacent the bottom bezel segment 46 using suitable fasteners such as for example, screws, clips, adhesive etc. As can be seen, the tool tray 34 comprises a housing that accommodates a master controller 50 (see FIG. 5) and that has an upper surface configured to define a plurality of receptacles or slots. The receptacles are sized to receive one or more pen tools P as well as an eraser tool that can be used to interact with the interactive surface 24. Control buttons are also provided on the upper surface of the tool tray housing to enable a user to control operation of the interactive input system 20. Further specifies of the tool tray 34 are described in International PCT Application Publication No. WO 2011/085486 filed on Jan. 13, 2011, the entire content of which is incorporated herein by reference.

Imaging devices 60 are accommodated by the bezel 26, with each imaging device being positioned adjacent a different corner of the bezel. The imaging devices 60 are oriented so that their fields of view overlap and look generally across the entire interactive surface 24. In this manner, any pointer such as for example a user's finger, a cylinder or other suitable object, or a pen or eraser tool lifted from a receptacle of the tool tray 34, that is brought into proximity of the interactive surface 24 appears in the fields of view of the imaging devices 60 and thus, is captured in image frames acquired by multiple imaging devices. A power adapter 52 provides the necessary operating power to the interactive board 22 when connected to a conventional AC mains power supply.

Figure 3:
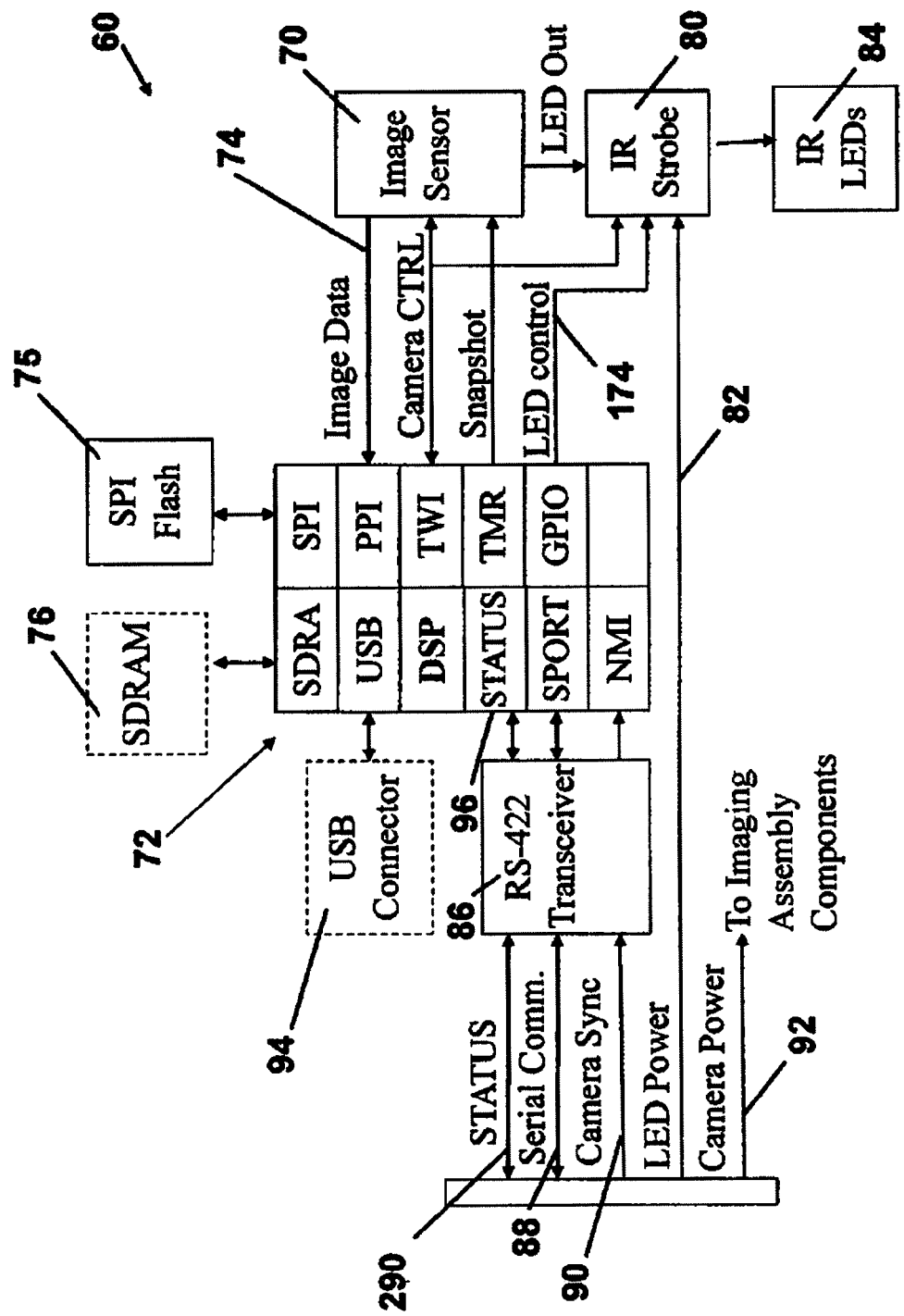
FIG. 3 is a block diagram of an imaging device forming part of the interactive input system of FIG. 1.

Turning now to FIG. 3, one of the imaging devices 60 is better illustrated. As can be seen, the imaging device 60 comprises an active pixel image sensor 70 such as that manufactured by Aptina (Micron) MT9V034 having a resolution of 752×480 pixels. The image sensor 70 is fitted with a two element, plastic lens (not shown) that provides the image sensor 70 with a field of view of approximately 104 degrees. In this manner, the other imaging devices 60 are within the field of view of the image sensor 70 thereby to ensure that the field of view of the image sensor 70 encompasses the entire interactive surface 24.

A digital signal processor (DSP) 72 such as that manufactured by Analog Devices under part number ADSP-BF522 Blackfin or other suitable processing device, communicates with the image sensor 70 over an image data bus 74 via a parallel port interface (PPI). A serial peripheral interface (SPI) flash memory 75 is connected to the DSP 72 via an SPI port and stores the firmware required for first stage image processing. Depending on the size of captured image frames as well as the processing requirements of the DSP 72, the imaging device 60 may optionally comprise synchronous dynamic random access memory (SDRAM) 76 to store additional temporary data as shown by the dotted lines. The image sensor 70 also communicates with the DSP 72 via a two-wire interface (TWI) and a timer (TMR) interface. The control registers of the image sensor 70 are written from the DSP 72 via the TWI in order to configure parameters of the image sensor 70 such as the integration period for the image sensor 70.

In this embodiment, the image sensor 70 operates in a snapshot mode. In the snapshot mode, the image sensor 70, in response to an external trigger signal received from the DSP 72 via the TMR interface that has a duration set by a timer on the DSP 72, enters an integration period during which an image frame is captured. Following the integration period after the generation of the trigger signal by the DSP 72 has ended, the image sensor 70 enters a readout period during which time the captured image frame is available. With the image sensor in the readout period, the DSP 72 reads the image frame data acquired by the image sensor 70 over the image data bus 74 via the PPI. The frame rate of the image sensor 70 in this embodiment is approximately 240 frames per second. The DSP 72 in turn processes image frames received from the image sensor 70 and provides pointer information to the master controller at a reduced rate of approximately 120 points/sec. Those of skill in the art will however appreciate that other frame rates may be employed depending on the desired accuracy of pointer tracking and whether multi-touch and/or active pointer identification is employed.

Three strobe circuits 80 communicate with the DSP 72 via the TWI and via a general purpose input/output (GPIO) interface. The IR strobe circuits 80 also communicate with the image sensor 70 and receive power provided on LED power line 82 via the power adapter 52. Each strobe circuit 80 drives a respective illumination source in the form of an infrared (IR) light emitting diode (LED) 84 that provides infrared lighting over the interactive surface 24. Further specifics concerning the strobe circuits 80 and their operation are described in International PCT Application Publication No. WO 2011/085480 entitled "INTERACTIVE INPUT SYSTEM AND ILLUMINATION SYSTEM THEREFOR" filed on Jan. 13, 2011, the content of which is incorporated herein by reference in its entirety.

The DSP 72 also communicates with an RS-422 transceiver 86 via a serial port (SPORT) and a non-maskable interrupt (NMI) port. The transceiver 86 communicates with the master controller 50 over a differential synchronous signal (DSS) communications link 88 and a synch line 90. Power for the components of the imaging device 60 is provided on power line 92 by the power adapter 52. DSP 72 may also optionally be connected to a USB connector 94 via a USB port as indicated by the dotted lines. The USB connector 94 can be used to connect the imaging device 60 to diagnostic equipment. The DSP 72 also comprises a status module 96 used to transmit and receive status signals between the master controller 50, as will be described.

Figure 4A:
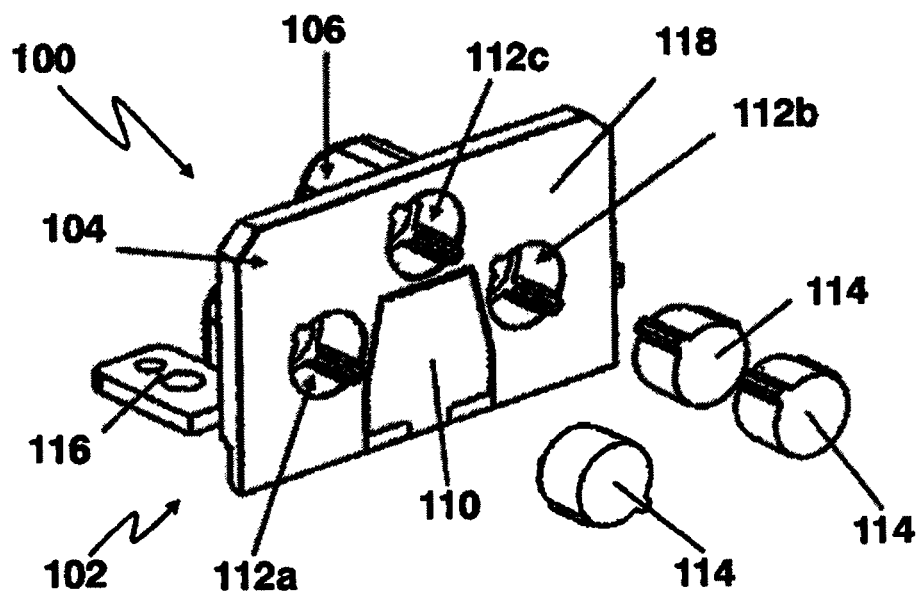
FIGS. 4A and 4B are front and rear perspective views of a housing assembly forming part of the imaging device of FIG. 3.
Figure 4B:
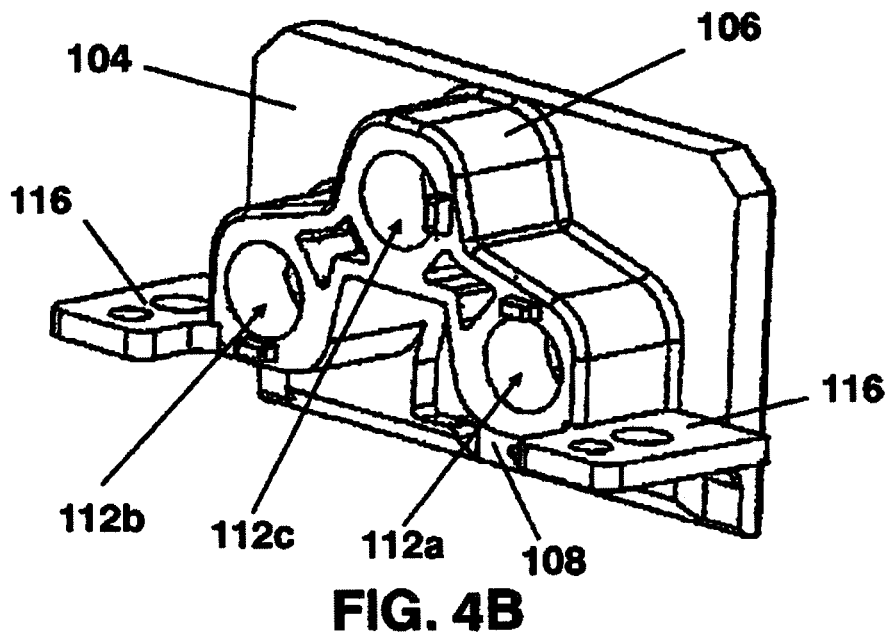

The image sensor 70 and its associated lens as well as the IR LEDs 84 are mounted on a housing assembly 100 that is best illustrated in FIGS. 4A and 4B. As can be seen, the housing assembly 100 accommodates the image sensor 70 and its associated lens as well as the IR LEDs 84. The housing assembly 100 comprises a polycarbonate housing body 102 having a front portion 104 and a rear portion 106 extending from the front portion. An imaging aperture 108 is centrally formed in the housing body 102 and accommodates an IR-pass/visible light blocking filter 110. The filter 110 has an IR-pass wavelength range of between about 830 nm and about 880 nm. The image sensor 70 and associated lens are positioned behind the filter 110 and oriented such that the field of view of the image sensor 70 looks through the filter 110 and generally across the interactive surface 24. The rear portion 106 is shaped to surround the image sensor 70. Three tubular passages 112a to 112c are formed through the housing body 102. Passages 112a and 112b are positioned on opposite sides of the filter 110 and are in general horizontal alignment with the image sensor 70. Passage 112c is centrally positioned above the filter 110. Each tubular passage receives a light source socket 114 that is configured to receive a respective one of the IR LEDs 84. Mounting flanges 116 are provided on opposite sides of the rear portion 106 to facilitate connection of the housing assembly 100 to the bezel 26 using suitable fasteners. A retro-reflective label 118 overlies the front surface of the front portion 104. Further specifics concerning the housing assembly 100 and its method of manufacture are described in International PCT Application Publication No. WO 2011/085478 entitled "HOUSING ASSEMBLY FOR INTERACTIVE INPUT SYSTEM AND FABRICATION METHOD" filed on Jan. 11, 2011, the content of which is incorporated herein by reference in its entirety.

Figure 5:
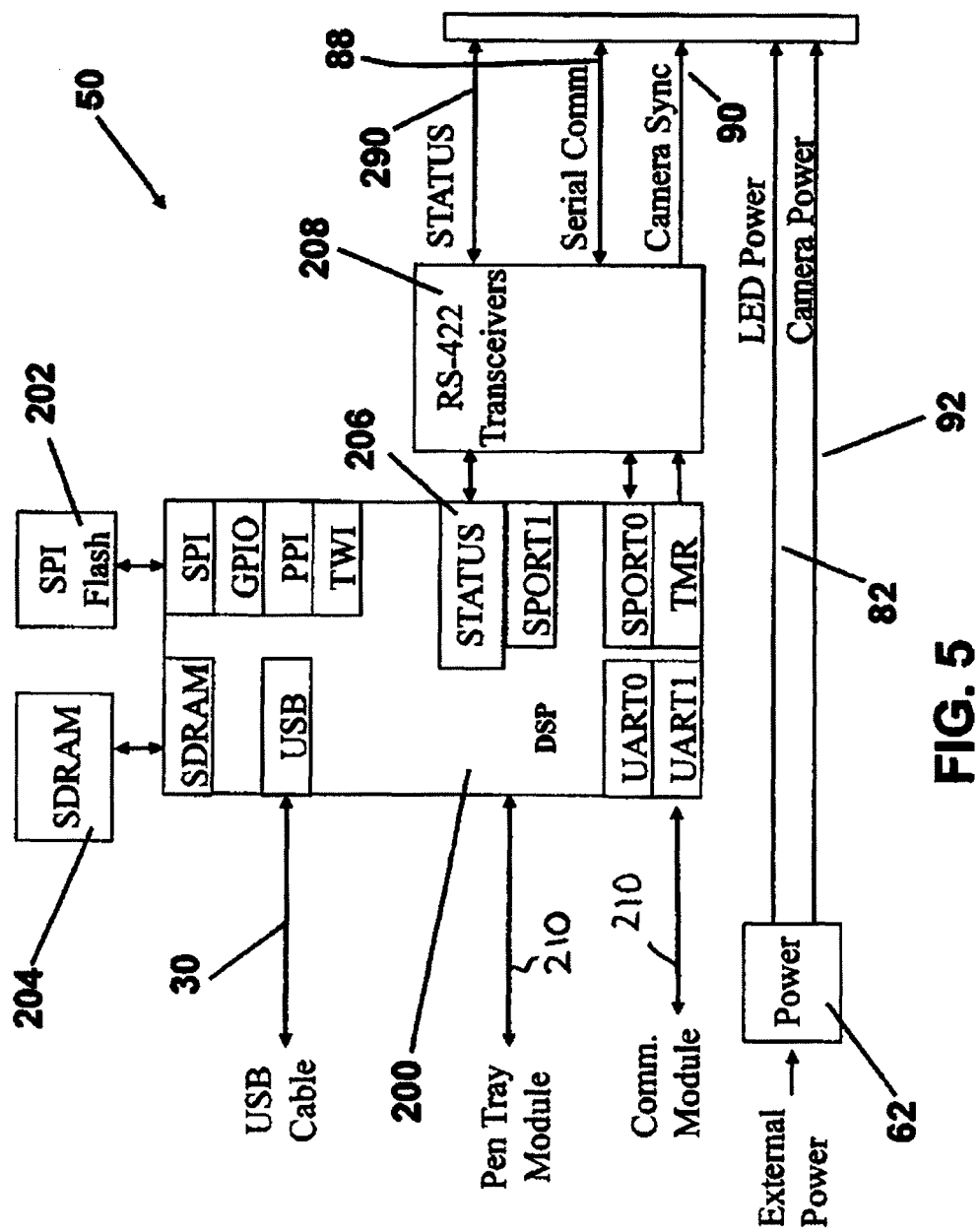
FIG. 5 is a block diagram of a master controller forming part of the interactive input system of FIG. 1.

Turning now to FIG. 5, the master controller 50 is better illustrated. As can be seen, master controller 50 comprises a DSP 200 such as that manufactured by Analog Devices under part number ADSP-BF522 Blackfin. A serial peripheral interface (SPI) flash memory 202 is connected to the DSP 200 via an SPI port and stores the firmware required for master controller operation. A synchronous dynamic random access memory (SDRAM) 204 that stores temporary data necessary for system operation is connected to the DSP 200 via an SDRAM port. The DSP 200 communicates with the general purpose computing device 28 over the USB cable 30 via a USB port. The DSP 200 communicates through its serial port (SPORT) with the imaging devices 60 via an RS-422 transceiver 208 over the differential synchronous signal (DSS) communication link 88. In this embodiment, as more than one imaging device 60 communicates with the DSP 200 over the DSS communication link 88, time division multiplexed (TDM) communications is employed. The DSP 200 also communicates with the imaging devices 60 via the RS-422 transceiver 208 over the synch line 90. DSP 200 communicates with modules of the tool tray 34 over communication links 210.

The DSP 200 also comprises a status module 206 for controlling the status of the interactive input system 20. The status module 206 comprises an interactive module 208, a standby module 210, and a power off module 212. The interactive module 208 detects satisfaction of one or more conditions to transition the interactive input system 20 to an interactive mode. The standby module 210 detects satisfaction of one or more conditions to transition the interactive input system 20 to a standby mode. Further specifies regarding the different modes of operation of the interactive input system 20 will be described below.

The general purpose computing device 28 in this embodiment is a personal computer or other suitable processing device comprising, for example, a processing unit, system memory (volatile and/or non-volatile memory), other non-removable or removable memory (eg. a hard disk drive, RAM, ROM, EEPROM, CD-ROM, DVD, flash memory, etc.) and a system bus coupling the various computing components to the processing unit. The general purpose computing device 28 may also comprise networking capabilities using Ethernet, WiFi, and/or other suitable network format, to enable connection to shared or remote drives, one or more networked computers, or other networked devices.

During operation in interactive mode, the DSP 200 of the master controller 50 outputs synchronization signals that are applied to the synch line 90 via the transceiver 208. Each synchronization signal applied to the synch line 90 is received by the DSP 72 of each imaging device 60 via transceiver 86 and triggers a non-maskable interrupt (NMI) on the DSP 72. In response to the synchronization signal, the DSP 72 of each imaging device 60 ensures that its local timers are within system tolerances and if not, corrects its local timers to match the master controller 50. Using one local timer, the DSP 72 initiates a pulse sequence via the snapshot line 78 that controls the acquisition time and frame rate of the image sensor 70 using the snapshot mode of the image sensor. The DSP 200 also initiates a second local timer that is used to control the LED control line 90 thereby to ensure the IR LEDs 84 are powered in the desired manner during the image capture cycle.

In response to the initiated pulse sequence, the image sensor 70 of each imaging device 60 acquires image frames at the desired image frame rate. In this manner, image frames captured by the image sensor 70 of each imaging device 60 can be referenced to the same point of time allowing the position of pointers brought into the fields of view of the image sensors 70 to be accurately triangulated. Also, by distributing the synchronization signals for the imaging devices 60, electromagnetic interference is minimized by reducing the need for transmitting a fast clock signal to each image assembly 60 from the central location. Instead, each imaging device 60 has its own local oscillator (not shown) and a lower frequency signal (e.g. the point rate, 120 Hz) is used to keep image frame capture synchronized.

During image frame capture, the DSP 72 of each imaging device 60 also provides output to the IR strobe circuits 80 to control the switching of the IR LEDs 84 so that the IR LEDs are illuminated in a given sequence that is coordinated with the image frame capture sequence of the image sensor 70. In particular, in the sequence, the first image frame is captured by the image sensor 70 when the IR LED 84 accommodated by the socket 114 in passage 112c is fully illuminated in a high current mode and the other IR LEDs are off. The next image frame is captured when all of the IR LEDs 84 are off. Capturing these successive image frames allows ambient light artifacts in captured image frames to be cancelled by generating difference image frames as described in U.S. Patent Application Publication No. 2009/0278794 to McReynolds et al., assigned to SMART Technologies ULC, the content of which is incorporated herein by reference in its entirety. The third image frame is captured by the image sensor 70 when only the IR LED 84 accommodated by the socket 114 in passage 112a is on and the fourth image frame is captured by the image sensor 70 when only the IR LED 84 accommodated by the socket 114 in the passage 112b is on. Capturing these image frames allows pointer edges and pointer shape to be determined as described in International PCT Application Publication No. WO 2011/085479 entitled "INTERACTIVE INPUT SYSTEM AND ILLUMINATION SYSTEM THEREFOR" filed on Jan. 14, 2011, the entire content of which is incorporated herein by reference. The IR strobe circuits 80 also control the IR LEDs 84 to inhibit blooming and to reduce the size of dark regions in captured image frames that are caused by the presence of the other imaging devices 60 within the field of view of the image sensor 70.

During the image frame capture sequence when each IR LED 84 is ON, each IR LED floods the region of interest over the interactive surface 24 with infrared illumination. Infrared illumination that impinges on the retro-reflective bands of bezel segments 40, 42, 44 and 46 and on the retro-reflective labels 118 of the housing assemblies 100 is returned to the imaging devices 60. As a result, in the absence of a pointer P, the image sensor 70 of each imaging device 60 sees a bright band having a substantially even intensity over its length together with any ambient light artifacts. When a pointer is brought into proximity with the interactive surface 24, the pointer occludes infrared illumination. As a result, the image sensor 70 of each imaging device 60 sees a dark region that interrupts the bright band in captured image frames. The reflections of the illuminated retro-reflective bands of bezel segments 40, 42, 44 and 46 and the illuminated retro-reflective labels 118 appearing on the interactive surface 24 are also visible to the image sensor 70.

When an image frame is captured by the image sensor 70 of one of the imaging devices 60 and the IR LEDs 84 associated with the other imaging devices 60 are off, the IR LEDs 84 and the filter 110 of the other imaging devices 60 appear as dark regions that interrupt the bright band. These dark regions can be problematic as they can be inadvertently recognized as pointers. To address this problem, when the image sensor 70 of one of the imaging devices 60 is capturing an image frame and its associated IR LEDs 84 are on, the IR strobe circuits 80 of the other imaging devices 60 are conditioned by the DSPs 72 to a low current mode. In the low current mode, the IR strobe circuits 80 control the operating power supplied to the IR LEDs 84 so that they emit infrared backlighting at a level that is substantially equal to reflected illumination returned by the retro-reflective bands on the bezel segments 40, 42, 44 and 46 and retro-reflective labels 118. As a result, the size of each dark region is reduced. Operating the IR LEDs 84 in this manner also inhibits blooming (i.e. saturation of image sensor pixels) which can occur if the IR LEDs 84 of the other imaging devices 60 are fully on during image frame capture.

The sequence of image frames captured by the image sensor 70 of each imaging device 60 is processed by the DSP 72 to identify each pointer in each image frame and to obtain pointer shape and pointer contact status information as described in above-incorporated International PCT Application Publication No. WO 2011/085479. The DSP 72 of each imaging device 60 in turn conveys the pointer data to the DSP 200 of the master controller 50. The DSP 200 in turn uses the pointer data to calculate the position of each pointer relative to the interactive surface 24 in (x,y) coordinates using well known triangulation as described in above-incorporated U.S. Pat. No. 6,803,906 to Morrison. This pointer coordinate data along with pointer shape and pointer contact status information is conveyed to the general purpose computing device 28 over the USB cable 30 allowing the image data provided to the projector for display on the interactive surface 24 to be updated to reflect pointer activity if required. In this manner, the image projected onto the interactive surface 24 by the projector is updated to reflect pointer activity proximate to the interactive surface.

As mentioned previous, the interactive input system 20 is operative in a plurality of modes including the interactive mode, the standby mode and the power OFF mode. During the interactive mode, the interactive input system 20 allows pointer activity made proximate to the interactive surface 24 to be recorded as writing or drawing or used to control execution of one or more application programs executed by the general purpose computing device 28, as described above. The interactive input system 20 is set to the standby mode upon satisfaction of one or more standby conditions such as for example elapsing of a threshold period of time of inactivity (when the interactive input system 20 is operating in the interactive mode), powering ON the interactive input system, or pressing a button associated with the interactive input system to switch the interactive input system to the standby mode. The interactive input system 20 is set to the power OFF mode upon satisfaction of one or more power OFF conditions such as for example, user selection of a button to power OFF the interactive input system 20 or elapsing of an extended threshold period of time of inactivity when the interactive input system 20 is in the standby mode.

Figure 6:
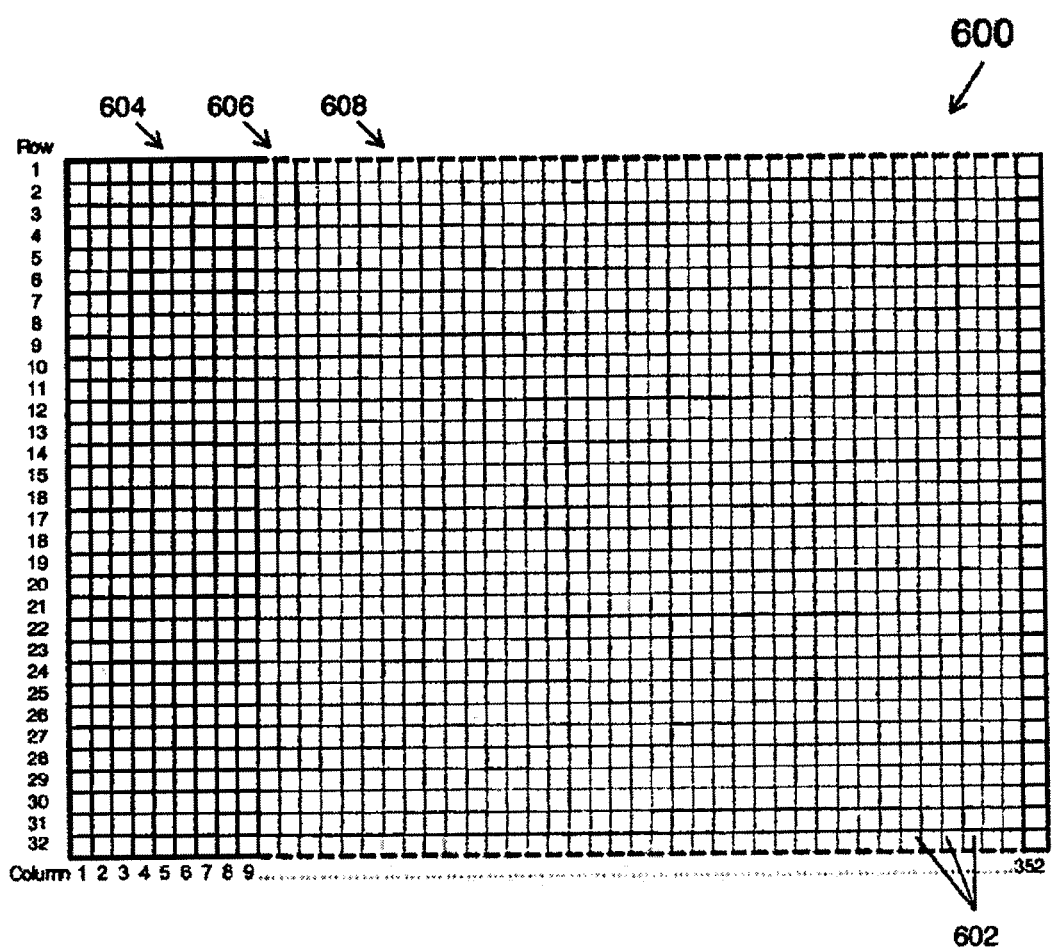
FIG. 6 is a simplified pixel array of an image sensor forming part of the imaging device of FIG. 3.

FIG. 6 shows a simplified pixel array 600 of the active pixel image sensor 70 of one of the imaging devices 60. As can be seen, the pixel array 600 comprises pixel cells 602 in both the horizontal (rows) and vertical directions (columns). The image sensor 70 is able to select the group of pixel cells 602 or "pixel subset" that is to be used to transfer image frame data to the DSP 72 for processing.

Each image sensor 70 is conditioned to capture image frames at various frame rates depending on the status of the interactive input system 20. When the interactive input system 20 is idle, it operates in the standby mode until a pointer is brought into the region of interest proximate the interactive surface 24, at which time the interactive input system 20 is conditioned to operate in the interactive mode as will be described. In this embodiment, when the interactive input system 20 operates in the standby mode, only the master controller 50 and one imaging device 60 are powered ON while all other components are powered OFF. The image sensor 70 of the imaging device 60 that is powered ON is conditioned to capture image frames at a low frame rate, in this example twelve (12) frames per second. A first pixel subset 604 having a resolution of 32×752 pixels of each captured image frame is communicated to the DSP 72 for processing to detect the presence of a potential pointer. As will be appreciated, the use of only one imaging device 60 capturing image frames at a low frame rate reduces the overall power requirements of the interactive input system 20 when operating in the standby mode as compared to operation in the interactive mode.

If a potential pointer is identified, a second imaging device 60 is activated and both imaging devices 60 are conditioned to capture image frames for a threshold amount of time, such as for example 0.5 seconds, at an increased frame rate, in this example, 120 frames per second. For each imaging device that is activated, a second pixel subset 606 having a resolution of 32×752 pixels of each captured image frame is communicated to the DSP 72 for processing to verify the existence of the pointer. If the existence of the pointer is verified, the interactive input system is conditioned to the interactive mode.

When the interactive input system 20 is conditioned to the interactive mode, all four (4) imaging devices 60 are activated and conditioned to capture image frames at a further increased frame rate, in this example, 240 frames per second. For each imaging device 60, a third pixel subset 608 having a resolution of 32×752 pixels of each captured image frame is communicated to the DSP 72 for processing. As will be appreciated, in this embodiment, the first pixel subset 604, second pixel subset 606, and third pixel subset 608 have the same resolution.

Figure 7:
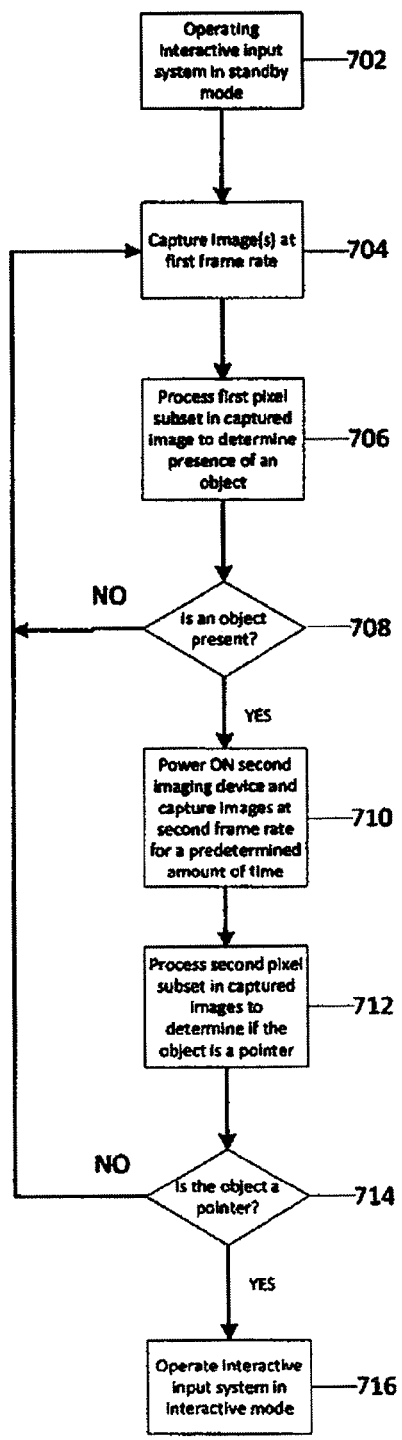
FIG. 7 is flowchart illustrating a method of operating the interactive input system of FIG. 1.

FIG. 7 is a flow diagram illustrating a method 700 of operating interactive input system 20. The interactive input system 20 is set to the standby mode by the status module 206 of the DSP 200 50 (step 702) upon satisfaction of one or more standby conditions such as for example elapsing of a threshold period time of inactivity, powering ON the interactive input system, or pressing a button associated with the interactive input system 20 to switch the interactive input system 20 to the standby mode. The DSP 200 outputs status signals from the status module 206 that are applied to the status line 290 via the transceiver 90. The status signals applied to the status line 290 are received by the status module 96 of each imaging device 60. When set to the standby mode, the status signals communicate a power OFF command to three of the DSP 72, and communicate a standby command to one of the imaging devices 60.

While the interactive input system 20 is in the standby mode, the imaging device 60 that has received the standby command is conditioned to capture image frames at the first frame rate as described above (step 704). As will be appreciated, the remaining imaging devices 60 are powered OFF. During image frame capture, the DSP 72 of the imaging device 60 provides output to the IR strobe circuits 80 to control the switching of the IR LEDs 84 so that IR LEDs 84 are illuminated in a manner coordinated with the image frame capture sequence of the image sensor 70.

Figure 8A:
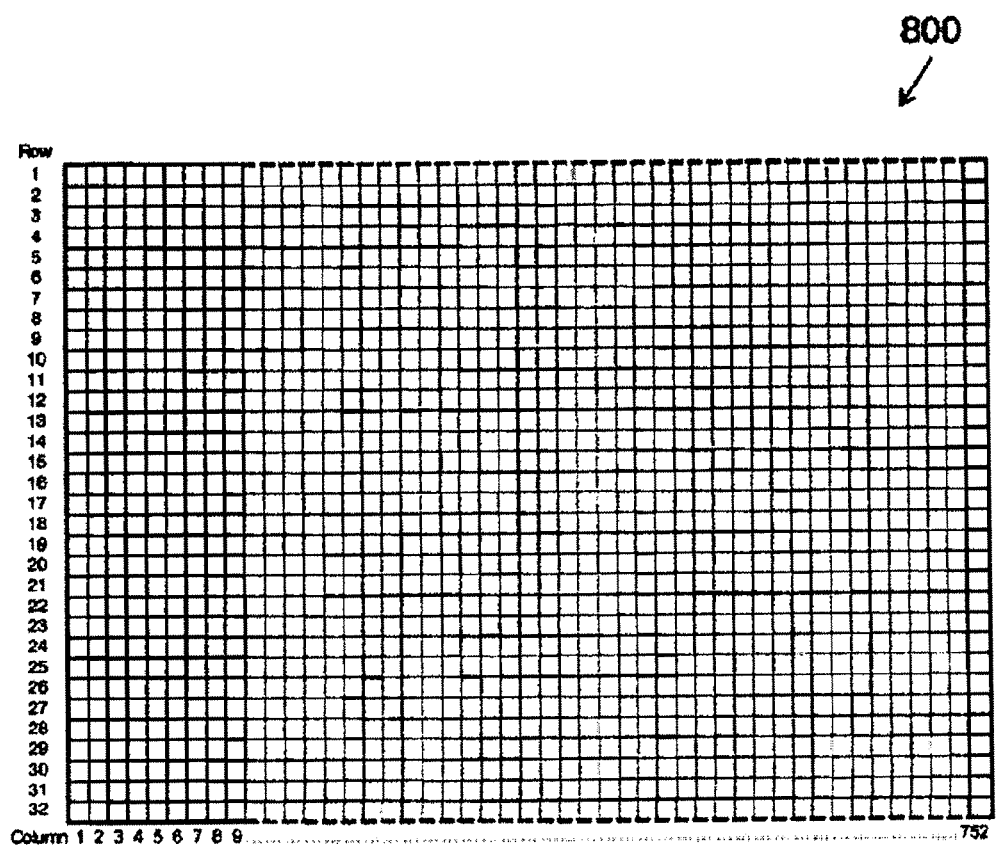
FIGS. 8A and 8B show exemplary image frame subsets that are processed when the interactive input system is in a standby mode.
Figure 8B:
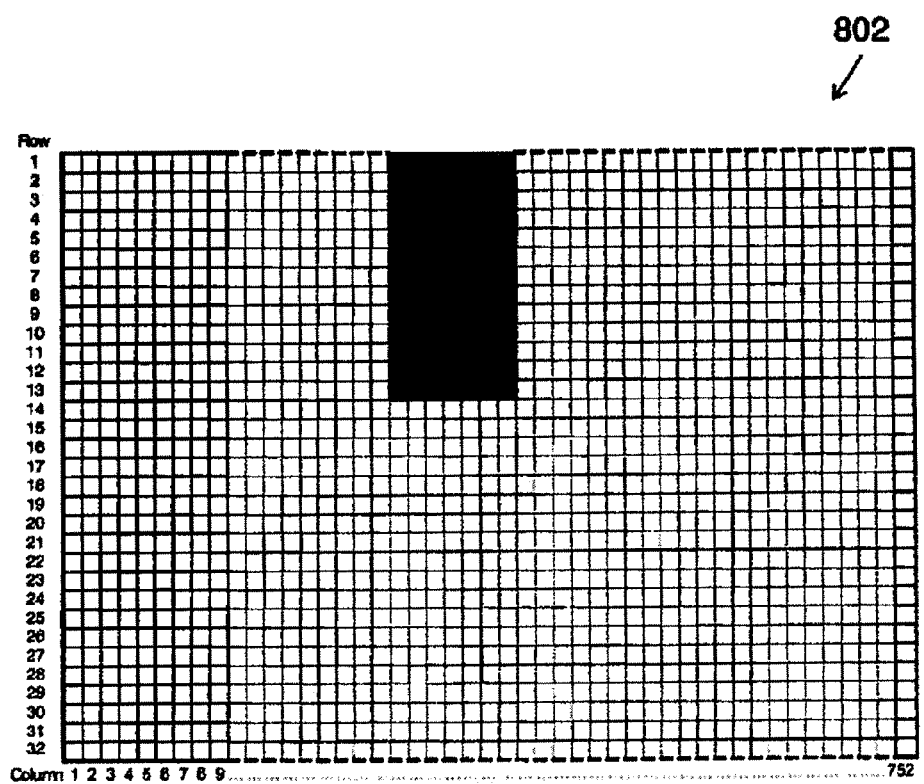
Figure 9A:
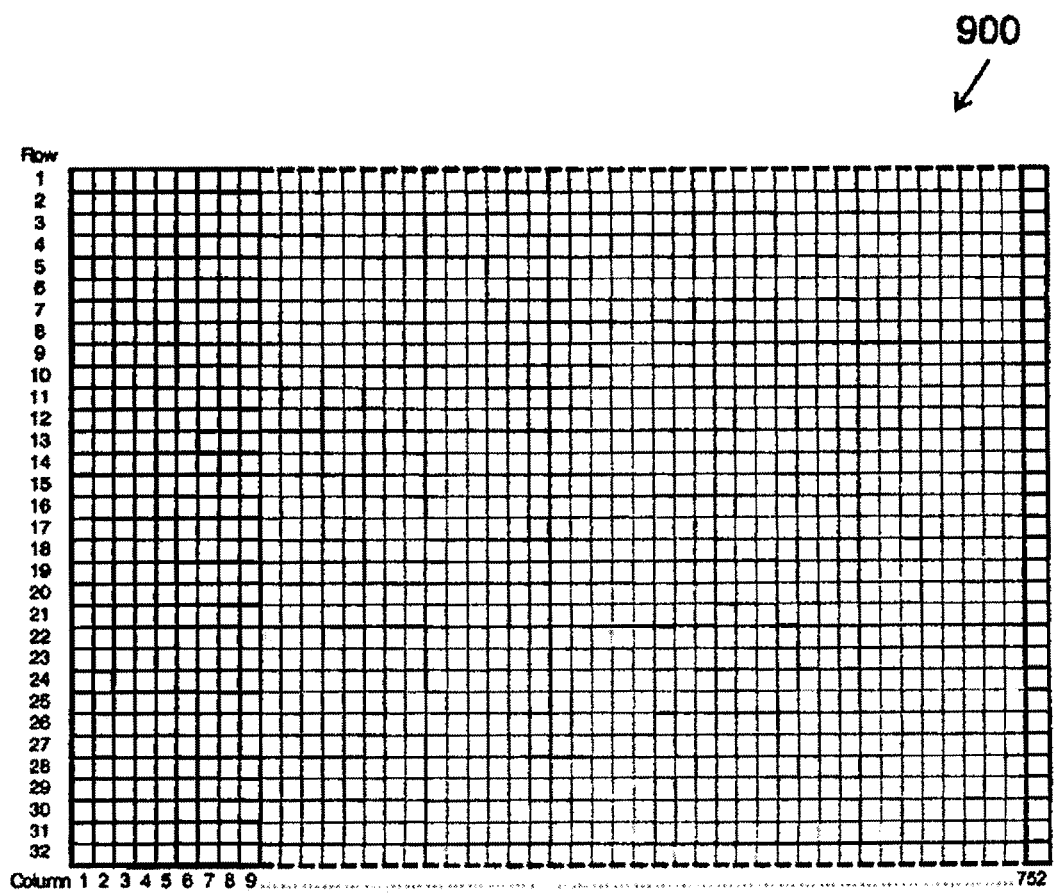
FIGS. 9A, 9B and 9C show exemplary image frame subsets that are processed when the interactive input system is determining if a potential pointer is a pointer.
Figure 9B:
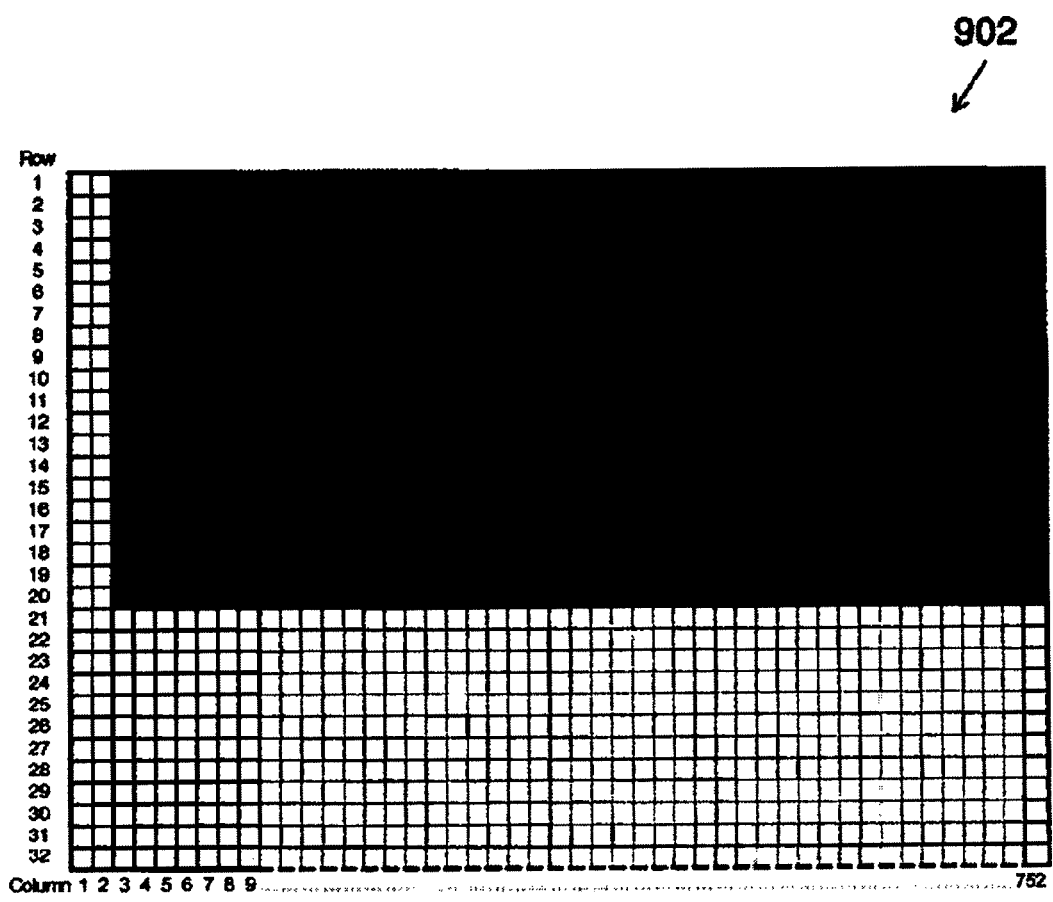
Figure 9C:
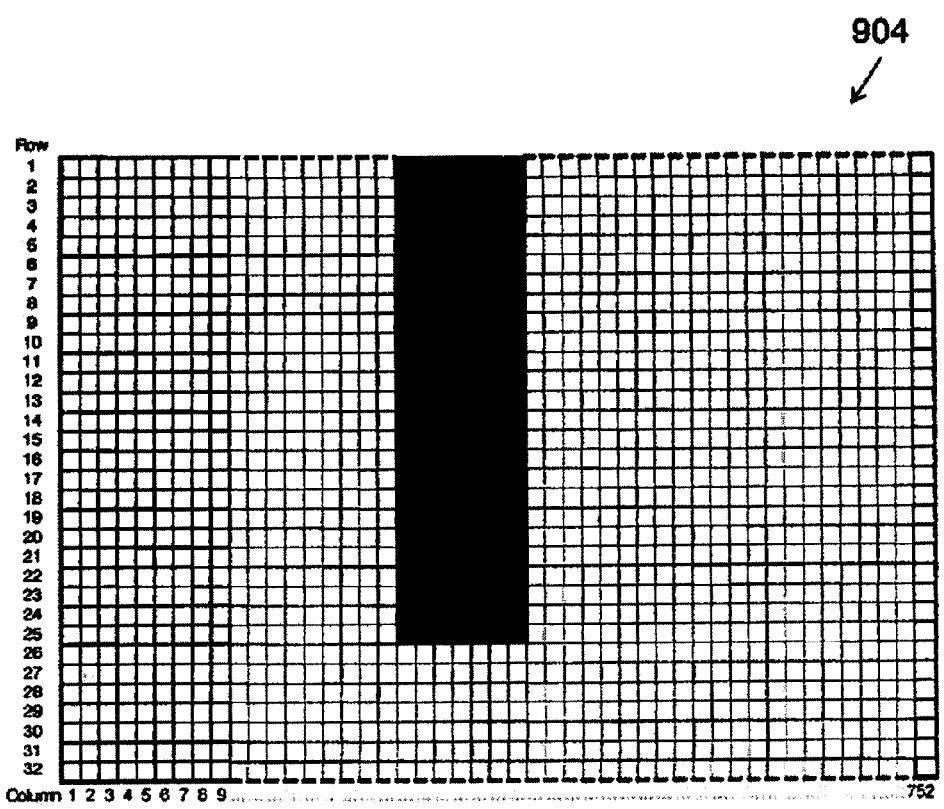

After a image frame has been captured, a first pixel subset of the captured image frame is communicated to DSP 72 for processing to determine the presence of an object (step 706). If no object is present in the first pixel subset, the method returns to step 704 wherein the imaging device 60 is conditioned to capture the next image frame at the first frame rate. An exemplary first pixel subset 800 is shown in FIG. 8A. As can be seen, in this example no object is present in the first pixel subset 800. If an object is present in the first pixel subset (step 708), a status signal is sent by DSP 72 to the DSP 200. FIG. 8B shows an exemplary first pixel subset 802 where an object is present. In response, a status signal is sent by DSP 200 to power ON a second imaging device 60. The two imaging devices 60 are then conditioned by their respective DSPs 72 to capture image frames at the second frame rate for a threshold amount of time as described above (step 710). For each imaging device 60, a second pixel subset of each of the captured image frames is sent to the DSP 72 for processing to determine if the object exists in the second pixel subset. If no object exists in the second pixel subset, it is assumed that the object is not a pointer and that a "false pointer" was originally detected and the method returns to step 704, wherein only the one imaging device 60 is conditioned to capture image frames at the first frame rate until another object is detected in the first pixel subset. FIG. 9A shows an exemplary second pixel subset 900 where no object is present. If the object exists in the captured image frames, the DSPs 72 process the respective captured image frames to determine if the object satisfies a pointer condition by comparing the size of the object in the captured image frames to a threshold size (step 712). If the object does not satisfy the pointer condition, that is, the size of the object is either greater or less than the threshold size, it is assumed that the object is not a pointer and that a "false pointer" was detected and the method returns to step 704, wherein only the one imaging device 60 is conditioned to capture image frames at the first frame rate until another object is detected in the first pixel subset. FIG. 9B shows an exemplary second pixel subset 902. As can be seen, a large portion of the second pixel subset 902 is dark. In this example, the dark region has a size greater than the threshold size, and thus, the object is deemed not to be a pointer. If the object satisfies the pointer condition (step 714), that is, the size of the object is within the threshold size, the DSPs 72 communicate an interactive status signal to the DSP 200 of the master controller 50. FIG. 9C shows an exemplary second pixel subset 904 where the object is deemed to be a pointer. In turn, the master controller 50 sets the interactive input system 20 to the interactive mode (step 716), wherein the DSP 200 of the master controller 50 outputs interactive status signals to the DSP 72 of each imaging device 60 and general purpose computing device 28, and the interactive input system 20 operates in the interactive mode as described above.

Although it is described that each image sensor is conditioned to capture image frames at various frame rates depending on the status of the interactive input system, those skilled in the art will appreciate that each image sensor can also be conditioned to transfer various pixel subsets to the DSP for processing depending on the status of the interactive input system. For example, in another embodiment, during the standby mode, a first pixel subset having a resolution of 4×752 pixels is processed for the imaging device that is powered ON. In the event a potential pointer is identified in the first pixel subset, a second pixel subset having a resolution of 8×752 pixels is processed for each of the two imaging devices that are powered ON. If a pointer is detected, the interactive input system is switched to operate in the interactive mode, wherein a third pixel subset having a resolution of 32×752 pixels is processed for all imaging devices.

In another embodiment, the short-throw projector is replaced with a projection system comprising a conventional projector unit and a low power LED projector unit, such as that described in U.S. patent application Ser. No. 13/078,758 to Hill et al., filed on Apr. 1, 2011, and entitled "PROJECTION UNIT AND METHOD OF CONTROLLING THE SAME", assigned to SMART Technologies ULC, the content of which is incorporated by reference in its entirety. In this embodiment, when the interactive input system operates in the standby mode, both the lower power LED projector unit and the general purpose computing device 28 are powered ON. The low power LED projector unit is conditioned to project feedback information such as a power button icon or power button text onto a specific location on the interactive surface 24. The first pixel subset is selected to correspond to the specific location on the interactive surface, such that the location of the feedback information is monitored. When a user wishes to use the interactive input system, the user simply needs to touch the power button icon or power button text, wherein the pointer will be detected as described above and the interactive input system switched to interactive mode.

Alternatively, the low power LED projector may be replaced by another type of projector such as for example a pico projector.

In another embodiment, the interactive input system comprises a feedback module to provide feedback to notify the user that the interactive input system is in the process of transitioning from the standby mode to the interactive mode. For example, the feedback module may comprise a visible LED that simply lights up when the interactive input system is transitioning from the standby mode to the interactive mode. Other types of feedback may be used by the feedback module, such as for example audible feedback, visible feedback, etc. In the embodiment described above wherein a projection system comprising a low power LED projector is used, the feedback module may provide feedback information in the form of a countdown timer projected by the low power LED projector onto the interactive surface. The countdown timer projects text or an icon onto the interactive surface estimating the time remaining until the interactive input system is transitioned to interactive mode.

Although a method of operating the interactive input system in the standby mode is described as monitoring a first pixel subset until a potential pointer is identified, monitoring a second pixel subset to determine if the potential pointer is indeed a pointer, and if so, setting the interactive input system to the interactive mode, those skilled in the art will appreciate that variations are available. For example, the first pixel subset may be monitored until a potential pointer is identified, and in the event a potential pointer is identified it may be assumed that the potential pointer is indeed a pointer and the interactive input system may be set to the interactive mode.

Although embodiments are described above wherein in the event a potential pointer is identified, a second imaging device is powered ON and two imaging devices are conditioned to capture image frames to determine if the potential pointer is a pointer, those skilled in the art will appreciate that other verification methods may be used. For example, in another embodiment, in the event a potential pointer is identified, only the one imaging device may be used to capture image frames of the region of interest, and a second pixel subset is processed to determine if the potential pointer is a pointer. The second pixel subset in this embodiment is chosen to comprise a greater pixel subset than the first pixel subset, such that a greater view of the region of interest is processed to determine if the potential pointer is indeed a pointer.

Although the pixel subsets are described as being comprised of rows and columns, those skilled in the art will appreciate that other pixel subsets may be selected. For example, every second pixel in each row or region may be selected. Other embodiments may have pixel subsets that are not rectilinear but may be formed to match the display surface, the bezel angle, or a desired interaction area.

Although the pixel subsets are described as being a fixed number of rows, those skilled in the art will appreciate that variations are available. For example, when operating in the standby mode, the first pixel subset may correspond to different locations of the captured image frame. In this embodiment, a captured image frame comprising 32 rows is broken up into 4×8 pixel subsets. Each time an image frame is captured, a different pixel subset is processed to determine the presence of an object. As an example, a first pixel subset comprising rows 1 to 4 in a first captured image frame will be processed. Next, a second pixel subset comprising rows 5 to 8 in a second captured image frame will be processed. After that, a third pixel subset comprising rows 9 to 12 in a third captured image frame will be processed. This process continues until the last set of rows, in particular rows 29 to 32, are processed. The cycle is then repeat until an object is found in one of the captured image frames. As will be appreciated, similar pixel subsets may be processed when the interactive input system is determining if an object is a pointer.

Although it is described that in the event that a potential pointer is identified, first and second imaging devices are used to capture image frames and pixel subsets are processed to determine if the object is a pointer, those skilled in the art will appreciate that different pixel subsets may be selected for each imaging device. For example, a pixel subset comprising rows 1 to 16 may be processed for image frames captured by the first imaging device, and a pixel subset comprising rows 17 to 32 may be processed for image frames captured by the second imaging device. In this embodiment, if an object is present in both of the captured image frames, the object is assumed to be a pointer and the interactive input system is switched to the interactive mode, as described above.

Although in embodiments described above the interactive input system is described as utilizing a projector-based system, those skilled in the art will appreciate that other types of interactive input systems may be used. For example, an interactive input system that engages a display unit such as for example a plasma television or a liquid crystal display (LCD) device may be used such as for example that described in U.S. Patent Application Publication No. 2011/0095989 to McGibney et al., filed on Oct. 23, 2009, and entitled "INTERACTIVE INPUT SYSTEM AND BEZEL THEREFOR", assigned to SMART Technologies ULC, the entire content of which is incorporated by reference.

Although embodiments have been described above with reference to the accompanying drawings, those of skill in the art will appreciate that variations and modifications may be made without departing from the scope thereof as defined by the appended claims.

What is claimed is:

1. A method of operating an interactive input system comprising:
    capturing images of a region of interest at a first frame rate when the interactive input system is operating in a standby mode;
    processing a first pixel subset of images captured at the first frame rate to detect a presence of an object;
    if an object is detected, capturing images of the region of interest at a second frame rate;
    processing a second pixel subset of images captured at the second frame rate to determine if the object is a pointer;
    in the event the object is a pointer, operating the interactive input system in an interactive mode, wherein operating the interactive input system in the interactive mode comprises capturing images of the region of interest at a third frame rate; and
    processing a third pixel subset of images captured at the third frame rate to determine the location of the pointer,
    wherein the first pixel subset comprises a first number of rows of each image captured at the first frame rate, wherein the second pixel subset comprises a second number of rows of each image captured at the second frame rate and wherein the second number of rows is greater than the first number of rows.

2. The method of claim 1 wherein the third pixel subset comprises a greater number of pixels than the first and second pixel subsets.

3. The method of claim 2 wherein the third pixel subset includes the first and second pixel subsets.

4. The method of claim 1 wherein the location of the pointer is calculated using triangulation.

5. The method of claim 1 wherein capturing images of the region of interest at the first frame rate comprises providing illumination generally across the region of interest.

6. The method of claim 5 wherein the illumination is modulated at the first frame rate.

7. The method of claim 1 wherein capturing images of the region of interest at the second frame rate comprises providing illumination generally across the region of interest.

8. The method of claim 7 wherein the illumination is modulated at the second frame rate.

9. The method of claim 1 wherein capturing images of the region of interest at the third frame rate comprises providing illumination generally across the region of interest.

10. The method of claim 9 wherein the illumination is modulated at the third frame rate.

11. The method of claim 5 wherein the illumination is infrared illumination.

12. The method of claim 1 wherein capturing images of the region of interest at the third frame rate comprising capturing images of the region of interest from different vantages.

13. The method of claim 1 comprising projecting a graphical object onto an interactive surface positioned proximate to the region of interest.

14. The method of claim 13 wherein the first pixel subset corresponds to a predetermined location on the interactive surface.

15. The method of claim 14 wherein the predetermined location corresponds to the location of the graphical object.

16. The method of claim 1 wherein the second pixel subset includes the first pixel subset.

17. The method of claim 1 wherein the third pixel subset comprises a third number of rows of each image captured at the third image frame, the third number of rows being greater than the first and second number of rows.

18. The method of claim 17 wherein the third pixel subset includes the first and second pixel subsets.

19. The method of claim 1 wherein capturing images at the first frame rate is performed by a single imaging device.

20. The method of claim 19 wherein capturing images at the second frame rate is performed by first and second imaging devices.

21. The method of claim 20 wherein capturing images at the third frame rate is performed by more than two imaging devices.

22. An interactive input system comprising:
    an interactive surface;
    at least two imaging devices configured to capture images of a region of interest proximate the interactive surface from different vantages; and
    processing structure communicating with the imaging devices and configured to:
        process a first pixel subset of images captured at a first frame rate to detect a presence of an object;
        if an object is detected, process a second pixel subset of images captured at a second frame rate to determine if the object is a pointer;
        in the event the object is a pointer, process a third pixel subset of images captured at a third frame rate to determine the location of the pointer, wherein the first pixel subset comprises a first number of rows of each image captured at the first frame rate, wherein the second pixel subset comprises a second number of rows of each image captured at the second frame rate and wherein the second number of rows is greater than the first number of rows.

23. The method of claim 6 wherein capturing images of the region of interest at the second frame rate comprises providing illumination generally across the region of interest.

24. The method of claim 23 wherein the illumination is modulated at the second frame rate.

25. The method of claim 23 wherein capturing images of the region of interest at the third frame rate comprises providing illumination generally across the region of interest.

26. The method of claim 25 wherein the illumination is modulated at the third frame rate.

27. The method of claim 21 wherein the location of the pointer is calculated using triangulation.

28. The interactive input system of claim 22 further comprising at least one illumination source configured to provide illumination generally across the region of interest at least when said imaging devices are capturing images.

29. The interactive input system of claim 28 wherein the illumination provided by said at least one illumination source is modulated.

30. The interactive input system of claim 29 wherein the illumination is modulated (i) at the first frame rate when images are being captured at the first frame rate, (ii) at the second frame rate when images are being captured at the second frame rate and (iii) at the third frame rate when images are being captured at the third frame rate.

31. The interactive input system of claim 30 wherein the illumination is infrared illumination.

32. The interactive input system of claim 22 wherein a graphical object is displayed on said interactive surface and wherein the first pixel subset corresponds to a location of the graphical object on the interactive surface.

33. The interactive input system of claim 22 wherein the second pixel subset includes the first pixel subset.

34. The interactive input system of claim 33 wherein the third pixel subset comprises a third number of rows of each image captured at the third image frame, the third number of rows being greater than the first and second number of rows.

35. The interactive input system of claim 34 wherein the third pixel subset includes the first and second pixel subsets.

36. The interactive input system of claim 22 wherein only one of said imaging devices is configured to capture images at the first frame rate.

37. The interactive input system of claim 36 wherein two imaging devices are configured to capture images at the second frame rate.

38. The interactive input system of claim 20 wherein more than two imaging devices are configured to capture images at the third frame rate.

39. The interactive input system of claim 20 wherein the location of the pointer is calculated using triangulation.

* * * * *